(12) United States Patent
Muramatsu

(10) Patent No.: US 7,896,354 B2
(45) Date of Patent: Mar. 1, 2011

(54) COMPOSITE SEALING MATERIAL

(75) Inventor: Akira Muramatsu, Machida (JP)

(73) Assignee: Nippon Valqua Industries, Ltd., Tokyo (JP)

( * ) Notice: Subject to any disclaimer, the term of this patent is extended or adjusted under 35 U.S.C. 154(b) by 401 days.

(21) Appl. No.: 12/279,277

(22) PCT Filed: Feb. 8, 2007

(86) PCT No.: PCT/JP2007/052208

§ 371 (c)(1),
(2), (4) Date: Aug. 13, 2008

(87) PCT Pub. No.: WO2007/009422

PCT Pub. Date: Aug. 23, 2007

(65) Prior Publication Data

US 2009/0174152 A1    Jul. 9, 2009

(30) Foreign Application Priority Data

Feb. 14, 2006    (JP) .............................. 2006-036993

(51) Int. Cl.
*F16J 15/00* (2006.01)
*F16J 15/02* (2006.01)
(52) U.S. Cl. .................. 277/584; 277/611; 277/639
(58) Field of Classification Search ................ 277/437, 277/584, 589, 611, 619, 638–639
See application file for complete search history.

(56) References Cited

U.S. PATENT DOCUMENTS

| | | | | |
|---|---|---|---|---|
| 2,965,421 A | * | 12/1960 | Zindler | 277/437 |
| 3,848,880 A | * | 11/1974 | Tanner | 277/584 |
| 3,918,726 A | | 11/1975 | Kramer | |
| 4,052,112 A | * | 10/1977 | Faber | 384/16 |
| 4,281,590 A | * | 8/1981 | Weaver | 92/244 |
| 4,681,327 A | | 7/1987 | d'Agostino et al. | |
| 5,536,018 A | | 7/1996 | Szott | |
| 2007/0075503 A1 | | 4/2007 | Hayashi et al. | |

FOREIGN PATENT DOCUMENTS

| | | |
|---|---|---|
| EP | 1087157 A2 | 3/2001 |
| JP | 50153348 U | 12/1975 |

(Continued)

*Primary Examiner*—Vishal Patel
(74) *Attorney, Agent, or Firm*—The Webb Law Firm

(57) ABSTRACT

A composite sealing material to be installed in a sealing groove includes a first sealing member that is located on the outer peripheral side of the sealing groove and that is made of an elastic member; and a second sealing member that is located on the inner peripheral side of the sealing groove and that is made of a material harder than the first sealing member, wherein the first sealing member is provided with a crosswise protrusion formed projecting in a radial inner direction from a radial inner side of the almost central section of the thickness direction; the second sealing member is formed in an almost cross sectional C shape by flange portions and formed at the both ends and an inner wall portion in an almost linear shape for connecting the flange portions; and a space is ensured between the crosswise protrusion and the inner wall portion in an almost linear shape of the second sealing member in a state that the first sealing member and the second sealing member are assembled in an integrated manner.

9 Claims, 9 Drawing Sheets

FOREIGN PATENT DOCUMENTS

| | | |
|---|---|---|
| JP | 61164862 U | 10/1986 |
| JP | 638476 U | 1/1988 |
| JP | 2001124213 A | 5/2001 |
| JP | 2005164027 A | 6/2005 |
| JP | 2005330988 A | 12/2005 |
| JP | 2007120738 A | 5/2007 |

* cited by examiner

COMPOSITE SEALING MATERIAL

TECHNICAL FIELD

The present invention relates to a composite sealing material that can be used in an ultra vacuum state for instance. More specifically, the present invention relates to a composite sealing material that can be suitably used for a semiconductor manufacturing apparatus or a gate valve incorporated in a semiconductor manufacturing apparatus.

BACKGROUND ART

Corresponding to a development of a semiconductor manufacturing apparatus, the requirements to members to be used for a semiconductor manufacturing apparatus have been severer, and the kinds of the requirements have been increased.

For instance, it is necessary for a sealing material that is used for a semiconductor manufacturing apparatus such as a dry etching apparatus and a plasma CVD apparatus to have a vacuum seal performance as a basic performance. In addition, it is also necessary to have performances such as a plasma resistance and a corrosive gas resistance depending on an installing position of an apparatus and a sealing material to be used.

Conventionally, a fluorocarbon rubber to which a fluid is hard to affect has been used for a sealing portion to which a plasma resistance and a corrosive gas resistance in addition to such a vacuum seal performance are required.

However, as an environment has been severer, for a fluorocarbon rubber, performances such as a plasma resistance and a corrosive gas resistance are insufficient. As a result, a new material has been required.

To such a requirement, Patent document 1 (Japanese Laid-Open Patent Publication No. 2005-164027) has been proposed for instance by the present applicant, as a composite sealing material having performances such as a vacuum seal performance, a plasma resistance, and a corrosive gas resistance, capable of preventing the vacuum seal performance from being deteriorated even in the case in which the composite sealing material is repeatedly used, capable of preventing metal particles from being generated in use, capable of being easily manufactured at a low cost, and applicable to so-called a "dovetail groove" which is used for a semiconductor manufacturing apparatus in general.

Patent document 1: Japanese Patent Application Laid-Open Publication No. 2005-164027

For a composite sealing member described in Patent document 1, since a section in charge of sealing is made of rubber, the vacuum seal performance can be prevented from being deteriorated even in the case in which the composite sealing material is repeatedly used. However, a section in charge of a plasma resistance or a corrosive gas resistance is made of a synthetic resin, a member made of a synthetic resin has no elasticity unlike a rubber member, and a relaxation occurs in the case in which the member is repeatedly used. Consequently, adhesiveness with a matching member is deteriorated as a repeated use, and a performance cannot be sufficiently maintained unfortunately.

The present invention was made in consideration of such conditions, and an object of the present invention is to provide a composite sealing material having performances such as a vacuum seal performance, a plasma resistance, and a corrosive gas resistance, capable of preventing the vacuum seal performance from being deteriorated even in the case in which the composite sealing material is repeatedly used, capable of preventing metal particles from being generated in use, applicable to so-called a "dovetail groove" which is used for a semiconductor manufacturing apparatus in general, and capable of preventing performances such as a plasma resistance and a corrosive gas resistance from being deteriorated even in the case in which the composite sealing material is used for a section that is repeatedly opened and closed, such as a gate valve on-off portion.

SUMMARY OF THE INVENTION

The present invention was made in order to achieve the above objects.

The composite sealing material 10 to be installed in a sealing groove 2 in accordance with the present invention, as depicted in FIG. 1, is characterized by comprising:

a first sealing member 6 that is located on the outer peripheral side of the sealing groove 2 and that is made of an elastic member; and a second sealing member 8 that is located on the inner peripheral side of the sealing groove 2 and that is made of a material harder than the first sealing member 6, wherein the first sealing member 6 is provided with a crosswise protrusion 12 formed projecting in a radial inner direction from a radial inner side of the almost central section of the thickness direction;

the second sealing member 8 is formed in an almost cross sectional C shape by flange portions 14 and 16 formed at the both ends and an inner wall portion 18 in an almost linear shape for connecting the flange portions 14 and 16; and a space 20 is ensured between the crosswise protrusion 12 and the inner wall portion 18 in an almost linear shape of the second sealing member 8 in a state that the first sealing member 6 and the second sealing member 8 are assembled in an integrated manner.

By the above configuration, in the case in which the composite sealing material 10 is press-fitted, the crosswise protrusion 12 is deformed in such a manner that the crosswise protrusion 12 falls into the space 20, thereby ensuring sealability of the first sealing member 6. In addition, since the space 20 is formed, a deformation of the first sealing member 6 is not prevented by the second sealing member 8.

Furthermore, since the second sealing member 8 is made of a material harder than the first sealing member 6, by locating the second sealing member 8 side onto a chamber side that is a side of severe environments such as a corrosive gas and plasma in a semiconductor manufacturing apparatus such as a dry etching apparatus and a plasma CVD apparatus for instance, the first sealing member 6 can be protected from a corrosive gas and plasma or the like, thereby preventing the sealability from being deteriorated.

Moreover, in this case, since the second sealing member 8 made of a material harder than the first sealing member 6 is located on the side of severe environments, a resistance against a corrosive gas and plasma or the like is satisfactory, and the entire of the first sealing member 6 made of an elastic member can be protected from a corrosive gas and plasma or the like, thereby preventing the sealability from being deteriorated.

The composite sealing material in accordance with the present invention is preferably characterized in that one side end face 12a of the crosswise protrusion 12 of the first sealing member 6 is formed almost flatly.

By the above configuration, the second sealing member 8 can be satisfactorily mounted to the first sealing member 6.

The composite sealing material in accordance with the present invention is preferably characterized in that the other side end face 12b of the crosswise protrusion 12 of the first sealing member 6 is formed projecting to the bottom face 26 side of the sealing groove 2.

The composite sealing material in accordance with the present invention is preferably characterized in that a convex is formed on one of the contact faces of the first sealing member 6 and the second sealing member 8, a concave is formed on the other contact face, and the convex and concave are assembled while being fitted into each other.

By the above configuration, the first sealing member 6 can be satisfactorily assembled with the second sealing member 8.

The composite sealing material in accordance with the present invention is preferably characterized in that an adhesive is disposed between the contact faces of the first sealing member 6 and the second sealing member 8.

As described above, in the case in which the contact faces are bonded to each other via an adhesive, the sealing members can be easily fixed to each other.

The composite sealing material in accordance with the present invention is preferably characterized in that the rubber forming the first sealing member is a fluorocarbon rubber.

As described above, in the case in which the rubber forming the first sealing member is a fluorocarbon rubber, even if the first sealing member comes into contact with a corrosive gas or plasma, a resistance against a corrosive gas and plasma or the like is satisfactory, thereby preventing the sealability from being deteriorated.

The composite sealing material in accordance with the present invention is preferably characterized in that the second sealing member 8 is made of a synthetic resin.

As described above, since the second sealing member 8 is made of a synthetic resin that is a material harder than the first sealing member 6, a resistance against a corrosive gas and plasma or the like is satisfactory, and the entire of the first sealing member 6 made of an elastic member can be protected from a corrosive gas and plasma or the like, thereby preventing the sealability from being deteriorated.

The composite sealing material in accordance with the present invention is preferably characterized in that a synthetic resin forming the second sealing member 8 is made of at least one kind of a synthetic resin selected from a fluorocarbon resin, a polyimide resin, a polyamideimide resin, a polyetherimide resin, a polyamideimide resin, a polyphenylene sulfide resin, a polybenzimidazole resin, and a polyether ketone resin.

As described above, since a synthetic resin forming the second sealing member 8 is the above synthetic resin, a resistance against a corrosive gas and plasma or the like is satisfactory, and the entire of the first sealing member 6 made of an elastic member can be protected from a corrosive gas and plasma or the like, thereby preventing the sealability from being deteriorated.

For the composite sealing material in accordance with the present invention, two members of a rubber and a synthetic resin are combined. Consequently, the composite sealing material can have performances such as a vacuum seal performance, a plasma resistance, and a corrosive gas resistance. In the case in which a tightening force is applied, the crosswise protrusion of the first sealing member is elastically deformed into the space formed between the first sealing member and the second sealing member in a rapid manner. In the case in which a tightening force is released, the first sealing member and the second sealing member become in the original state in a rapid manner. Consequently, even in the case in which the composite sealing material is used repeatedly, a vacuum seal performance and adhesiveness with a matching member is prevented from being deteriorated. Moreover, in the case in which a rubber or a synthetic resin is used for the first sealing member and the second sealing member, a metal particle is not prevented from being generated when the composite sealing material is used. Furthermore, the composite sealing material can be easily manufactured at a comparatively low cost.

The composite sealing material in accordance with the present invention can be preferably applied to a so-called dovetail groove used in a semiconductor manufacturing apparatus.

BRIEF DESCRIPTION OF THE DRAWINGS

FIG. 8(A) is a schematic side view thereof, and FIG. 8(B) is an enlarged cross-sectional view thereof.

BEST MODE OF CARRYING OUT THE INVENTION

A composite sealing material in accordance with the present invention will be described below in detail with reference to the drawings.

Figure 1:
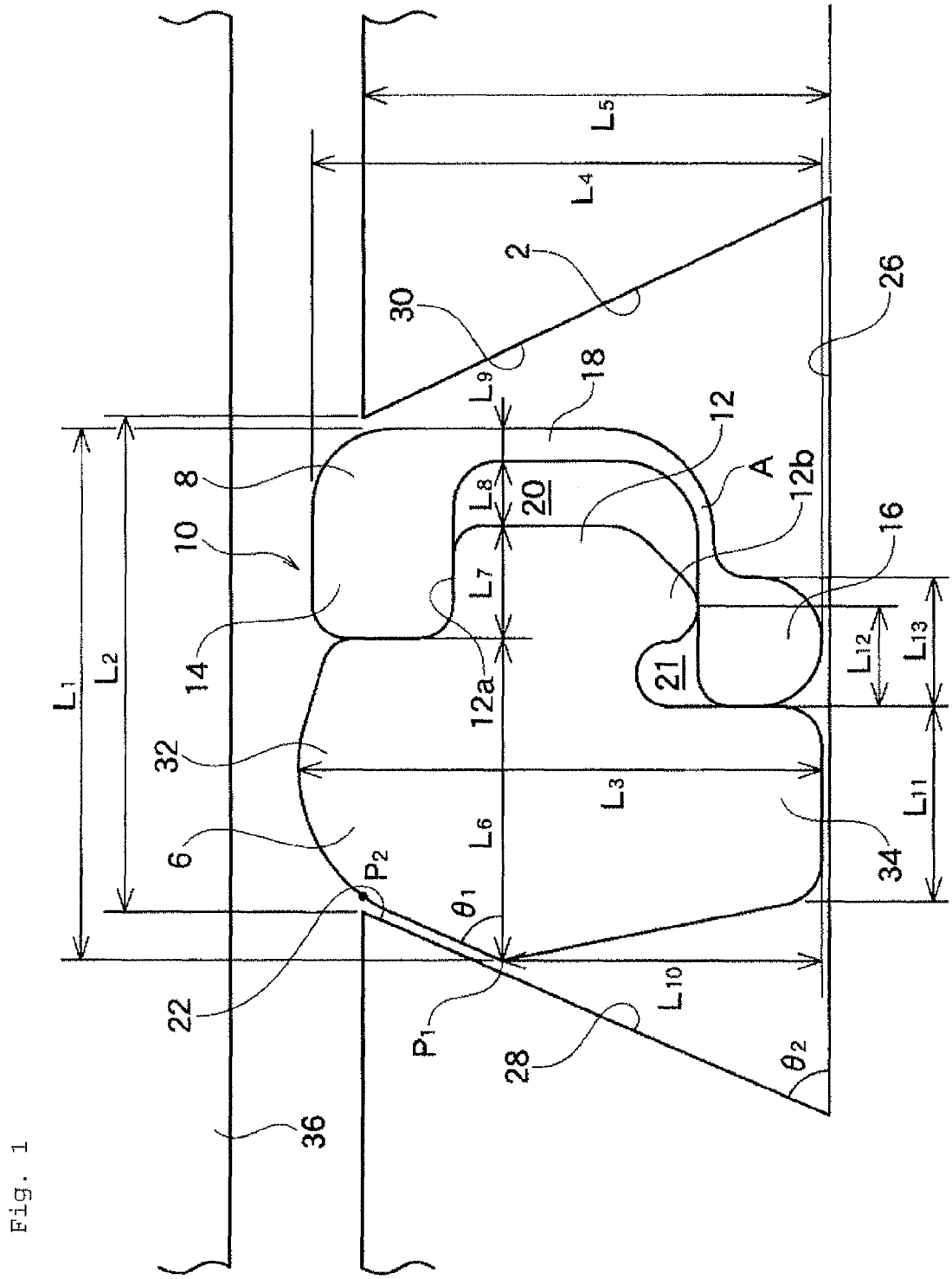
FIG. 1 is a schematic view for illustrating a dimensional relationship between a composite sealing material and a sealing groove in the case in which a composite sealing material in accordance with the present invention is installed in so-called a "dovetail groove", which is a sealing groove.

FIG. 1 shows a composite sealing material in accordance with an embodiment of the present invention.

The composite sealing material 10 in accordance with an embodiment of the present invention is formed in a closed circular shape and is installed in a sealing groove 2 in an almost circular shape. FIG. 1 shows a left cross section of the sealing groove 2 disposed in a horizontal state.

For instance, the sealing groove 2 is formed in a joint section of a semiconductor manufacturing apparatus such as a dry etching apparatus and a plasma CVD apparatus. The sealing groove 2 is so-called a "dovetail groove", which is a sealing groove in which a width of a bottom face 26 of the sealing groove 2 is larger than a width of an opening portion 22 side of the sealing groove 2.

The composite sealing material 10 is provided with a first sealing member 6, which is located on one side wall 28 side (outer peripheral side) of the sealing groove 2, and a second sealing member 8, which is located on the other side wall 30 side (inner peripheral side) of the sealing groove 2. That is to say, for the composite sealing material 10, the second sealing member 8 is located on a side of severe environments such as a corrosive gas and plasma in a semiconductor manufacturing apparatus, and the first sealing member 6 is located on a side opposite to the side of severe environments (for instance, an atmospheric side).

In the first sealing member 6, a crosswise protrusion 12 is formed projecting in a radial inner direction from the almost central section of the thickness direction. Moreover, the first sealing member 6 is provided with a first swelled portion 32 that functions as a sealing section to a matching member 36 when being deformed and that is formed on the opening end side of the sealing groove 2 and is provided with a lower protrusion 34 on a side opposite to the first swelled portion 32, that is, on the bottom face side of the sealing groove 2.

The top portion of the first swelled portion 32 is formed swelling in an almost circular arc shape. The bottom face of the lower protrusion 34 is formed almost flatly in such a manner that the bottom face comes into contact closely to the bottom face 26 side of the sealing groove 2. One side end face 12a of the crosswise protrusion 12 is formed almost flatly, and the other side end face 12b of the crosswise protrusion 12 is projected to the bottom face 26 side of the sealing groove 2.

As described above, the first sealing member 6 is provided with the first swelled portion 32 that configures a sealing face to a matching member 36, the lower protrusion 34 that is disposed on the bottom face side of the sealing groove 2, and the crosswise protrusion 12 that is projected in a radial inner direction. Consequently, the first sealing member 6 is projected in three directions when being viewed in a cross sectional shape. A corner portion P1 is formed on the outer peripheral face opposite to the projecting direction of the crosswise protrusion 12. The corner portion P1 enables the first swelled portion 32 and the lower protrusion 34 to be smoothly connected to each other.

In this case, it is preferable that the first sealing member 6 is made of a rubber that is an elastic member. As a rubber, any of a natural rubber and a synthetic rubber can be used.

As described above, since the first sealing member 6 is made of a rubber that is an elastic member, in the case in which the composite sealing material 10 is press-fitted to the matching member 36, the first swelled portion 32 of the first sealing member 6 is press-fitted by the matching member 36 to impart high sealability. Moreover, in this case, it is preferable that the rubber that forms the first sealing member 6 is a fluorocarbon rubber.

As such a fluorocarbon rubber, there can be used a vinylidene fluoride rubber of a binary system such as a vinylidene fluoride/hexafluoropropylene copolymer, a vinylidene fluoride/trifluorochloroethylene copolymer, and a vinylidene fluoride/pentafluoropropylene copolymer, a vinylidene fluoride rubber of a ternary system such as a vinylidene fluoride/tetrafluoroethylene/hexafluoropropylene copolymer, a vinylidene fluoride/tetrafluoroethylene/perfluoroalkylvinyl ether copolymer, and a vinylidene fluoride/tetrafluoroethylene/propylene copolymer, a tetrafluoroethylene/propylene copolymer, a tetrafluoroethylene/perfluoroalkylvinyl ether copolymer, and a thermoplastic fluorocarbon rubber.

As described above, since the rubber that forms the first sealing member 6 is a fluorocarbon rubber, even in the case in which the first sealing member 6 comes into contact with a corrosive gas or plasma, a resistance against a corrosive gas and plasma or the like is satisfactory, thereby preventing the sealability from being deteriorated.

The second sealing member 8 is located on the inner peripheral side of the first sealing member 6 and is formed separately from the first sealing member 6. The second sealing member 8 is provided with a pair of flange portions 14 and 16 in such a manner that the flange portions 14 and 16 can hold the crosswise protrusion 12 of the first sealing member 6 from the both sides, and is provided with an inner wall portion 18 in an almost linear shape for connecting the pair of flange portions 14 and 16 on a radial inner side. By the pair of flange portions 14 and 16 and the inner wall portion 18, the second sealing member 8 is formed in an almost cross sectional C shape when being viewed in a cross sectional shape.

Moreover, it is preferable that the second sealing member 8 is made of a synthetic resin that is a material harder than the first sealing member 6, preferably at least one kind of a synthetic resin selected from a fluorocarbon resin, a polyimide resin, a polyamideimide resin, a polyetherimide resin, a polyamideimide resin, a polyphenylene sulfide resin, a polybenzimidazole resin, and a polyether ketone resin.

As described above, since the second sealing member 8 is made of a synthetic resin that is a material harder than the first sealing member 6, a resistance against a corrosive gas and plasma or the like is satisfactory, and the entire of the first sealing member 6 made of an elastic member can be protected from a corrosive gas and plasma or the like, thereby preventing the sealability from being deteriorated.

In this case, as such a fluorocarbon resin, there can be mentioned a polytetrafluoroethylene (PTFE) resin, a tetrafluoroethylene-perfluoroalkylvinyl ether copolymer (PFA) resin, a tetrafluoroethylene-hexafluoropropylene copolymer (FEP) resin, a tetrafluoroethylene-ethylene copolymer (ETFE) resin, a polyvinylidene fluoride (PVDF) resin, a polychlorotrifluoroethylene (PCTFE) resin, a chlorotrifluoroethylene-ethylene copolymer (ECTFE) resin, and a polyvinyl fluoride (PVF) resin. Among the above resins, PTFE is preferable in consideration of a heat resistance, a corrosive gas resistance, and a plasma resistance.

The first sealing member 6 and the second sealing member 8 in accordance with an embodiment of the present invention are made of the above materials. In the case in which the both members are assembled in an integrated manner, a concave space 20 is ensured in advance between the crosswise protrusion 12 of the first sealing member 6 and the inner wall portion 18 in an almost linear shape of the second sealing member 8.

Moreover, in the case in which the both members are assembled, a space 21 is formed among the lower protrusion 34 and the crosswise protrusion 12b of the first sealing member 6 and a flange portion 16 of the second sealing member 8.

The preferable dimensions of the main sections of the composite sealing material 10 will be described in the following.

As shown in FIG. 1, as a seal width L1 of the composite sealing material 10 is larger than a groove width L2 of the sealing groove 2, a dropping out resistance of the composite sealing material 10 from the sealing groove 2 is increased, and it becomes however difficult to install the composite sealing material 10. Therefore, it is preferable that the seal width L1 is in the range of 101% to 130% of the groove width L2.

Moreover, it is preferable to set a seal height L3 of the rubber portion specified by the first sealing member 6 in such a manner that a squeeze ratio is in the range of 3% to 45%, preferably in the range of 5% to 30%. In this case, a squeeze ratio is calculated by the expression of [(seal height L3)−(groove depth L5)/seal height L3]×100. A magnitude relation between L3 and L4 is not considered.

As a rubber width L6 of the first swelled portion 32 of the first sealing member 6 is larger, a contact portion with the matching member 36 is larger, thereby stabilizing a vacuum sealing performance. However, a resin width (L7+L8+L9) of the second sealing member 8 is reduced, thereby deteriorating a screening effect of plasma and a corrosive gas. Consequently, it is preferable that a width L6 is in the range of 50% to 70% of the seal width L1.

In the case in which a projecting length L7 of the crosswise protrusion 12 of the first sealing member 6 is enlarged, a restoring force of the first sealing member 6 can be applied to the second sealing member 8 in a wide range, thereby improving a screening effect of plasma and a corrosive gas. However, as the length L7 is enlarged, the width L6 becomes smaller, thereby deteriorating a vacuum sealing performance. Consequently, it is preferable that the width L7 is in the range of 25% to 45% of the width L6.

For a width L8 of a space 20 between the first sealing member 6 and the second sealing member 8, since the crosswise protrusion 12 of the first sealing member 6 goes inside into the space 20 during a compression, a thin portion A of the second sealing member 8 falls in such a manner that the thin portion A is rotated in a clockwise direction in FIG. 1, thereby deforming the flange portion 16. It is preferable that the width L8 of the space 20 is 50% or higher of the width L7.

As a thickness L9 of the inner wall portion 18 in an almost linear shape of the second sealing member 8 is thinner, the flange portion is deformed more smoothly. However, it is preferable that the thickness L9 is in the range of 50 μm to 2 mm in consideration of workability.

Moreover, in the case in which the first sealing member 6 is compressed, the first sealing member 6 is smoothly deformed along one side wall 28. Therefore, a face between the corner portion P1 of the first sealing member 6 and a point P2, which has a height equivalent to that of the opening portion 22 of the sealing groove 2, is preferably an inclined face in such a manner that an angle θ1 is an angle θ2±2° for the sealing groove 2.

Moreover, a face from a point P2 to a contact point with the second sealing member 8, which is a sealing face of the first swelled portion 32, is a smoothly curved face.

It is preferable that a height L10 from the bottom face of the first sealing member 6 to the corner portion P1 is equivalent to the groove depth L5 or less to prevent the composite sealing material 10 from dropping out. However, in the case in which the height L10 is too small, the composite sealing material 10 rolls along the side wall 28 of the sealing groove 2 during an installation, thereby causing an installation of the composite sealing material 10 to be difficult. Therefore, it is preferable that the height L10 is in the range of 50% to 70% of the height L3 of the first sealing member 6 and that the height L10 is less than the groove depth L5.

In the case in which the bottom width L11 of the first sealing member 6 is larger, the composite sealing material 10 is hard to roll. However, since the bottom width L11 is less than the width L6, in the case in which the crosswise protrusion 12 of the first sealing member 6 goes inside into the space 20 during a compression, to deform the second sealing member 8 in such a manner that the second sealing member 8 falls, it is preferable that the width L11 is 20% or higher of L2 and that the bottom width L11 is less than the width L6.

In the case in which the L7 section of the first sealing member 6 goes inside into the space 20 during a compression, to deform the thin portion A of the second sealing member 8 in such a manner that the thin portion A falls, it is preferable that the bottom width L12 of the second sealing member 8 is set in such a manner that (L11+L12) is less than (L6+L7).

It is preferable that a length L13 from the side end face of the lower protrusion 34 of the first sealing member 6 to the side end face of the crosswise protrusion 12 is in the range of 50% to 150% of the width L12.

It is preferable that the thin portion A of the second sealing member 8 is in the R shape in such a manner that the thin portion A is deformed in whole. If only a part of the thin portion A is deformed in large excess, the thin portion A may be damaged. It is preferable that the flange portion 16 of the second sealing member 8 is in the R shape in such a manner that the flange portion 16 is rotated with a compression to deform the thin portion A. That is to say, if the flange portion 16 is not rotated, the second sealing member 8 does not fall and a load is applied to the second sealing member 8, thereby causing a relaxation to easily occur.

It is preferable that the side end face 12b of the crosswise protrusion 12 of the first sealing member 6 is in a convexed shape in such a manner that the side end face 12b presses and strongly rotates the flange portion 16 with a compression.

As described above, while a method of joining in an integrated manner the first sealing member 6 and the second sealing member 8 in which each dimension is specified is not restricted in particular, there can be adopted a publicly known joining method such as welding, depositing, bonding, and molding in an integrated manner. It is possible to fabricate the composite sealing material by joining in an integrated manner using an adhesive as needed, preferably a heat resistant adhesive.

Alternatively, a convex is formed on one of the contact faces of the first sealing member 6 and the second sealing member 8 and a concave is formed on the other contact face. An adhesive can be disposed between the convex and concave contact faces to assemble the first sealing member 6 and the second sealing member 8 in an integrated manner.

Figure 2:
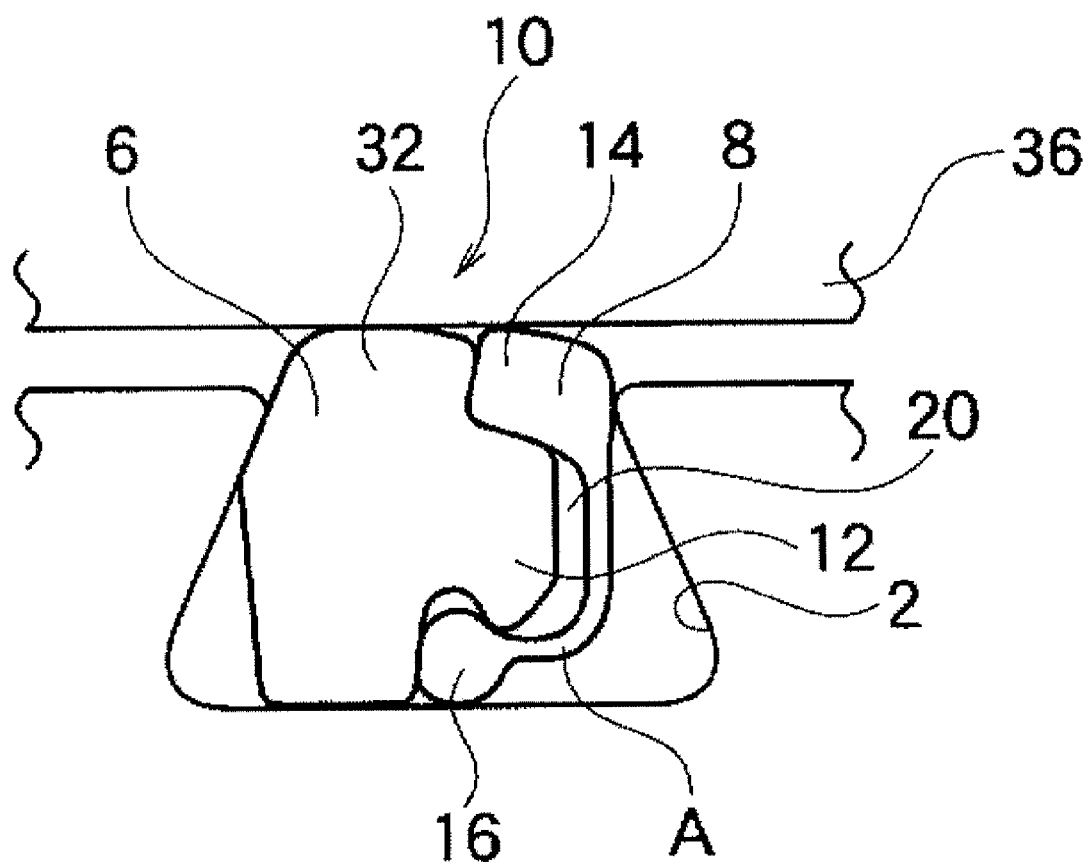
FIG. 2 is a schematic view for illustrating an initial state in which a composite sealing material in accordance with the present invention is installed and press-fitted in a sealing groove.
Figure 3:
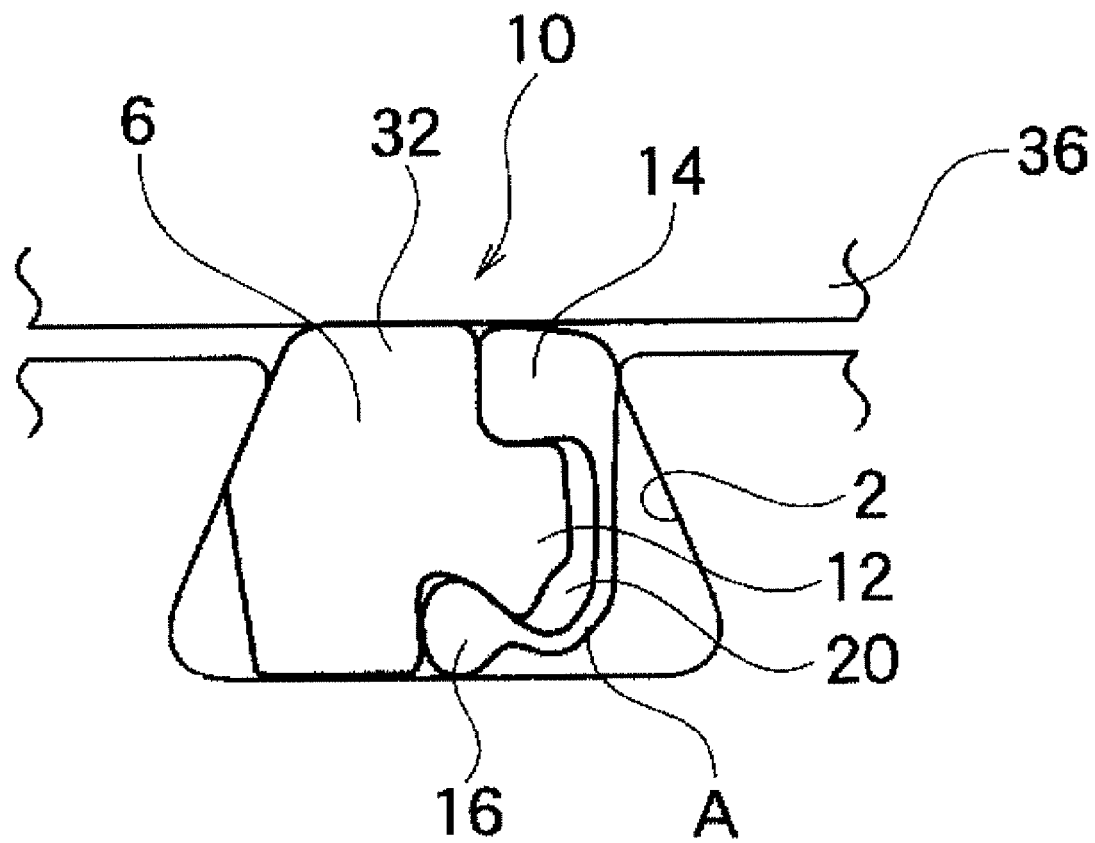
FIG. 3 is a schematic view for illustrating a state in which a composite sealing material in accordance with the present invention is installed and press-fitted in a sealing groove and a more force is applied to the composite sealing material from the state shown in FIG. 2.
Figure 4:
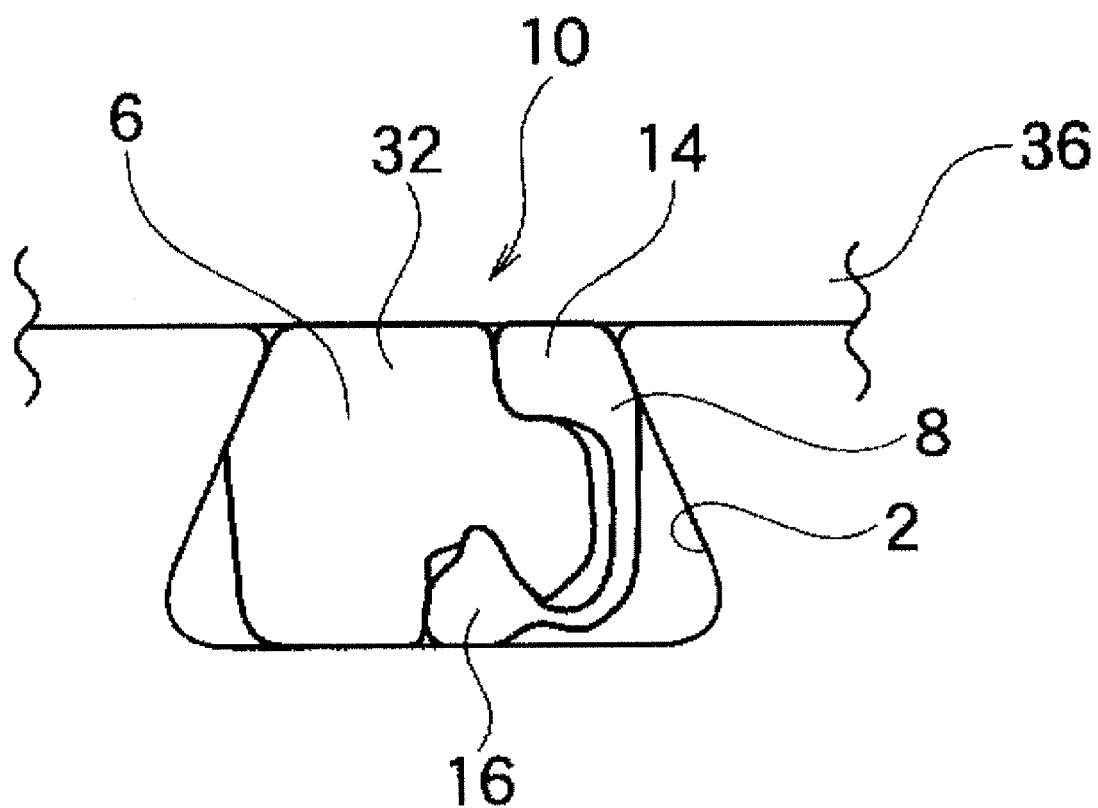
FIG. 4 is a schematic view for illustrating a state in which a composite sealing material in accordance with the present invention is installed and press-fitted in a sealing groove and a more force is applied to the composite sealing material from the state shown in FIG. 3.

The composite sealing material 10 having the above configuration in accordance with the present invention is used as shown in FIGS. 2 to 4.

As shown in FIG. 2, the composite sealing material 10 is installed into the sealing groove 2. In this case, the space 20 and the space 21 are formed between the first sealing member 6 and the second sealing member 8, and the inner wall portion 18 in an almost linear shape capable of elastically deforming easily is formed in the second sealing member 8, thereby enabling the composite sealing material 10 to be easily installed into the sealing groove 2. In addition, after the composite sealing material 10 is installed into the sealing groove 2, the composite sealing material 10 can be prevented from unexpectedly dropping out from the sealing groove 2 since the entire width of the composite sealing material 10 is larger than a width of the opening portion 22 of the sealing groove 2.

Moreover, as shown in FIGS. 2 to 4, in the case in which a tightening force is increased to the composite sealing material 10, the first swelled portion 32 of the first sealing member 6 and the flange portion 14 of the second sealing member 8 are compressed by a gradual process, thereby imparting a vacuum seal performance and a plasma resistance.

In the case in which the compression progresses as shown in FIG. 3 from the state shown in FIG. 2 in which the first swelled portion 32 of the first sealing member 6 is abutted to the matching member 36, the crosswise protrusion 12 of the first sealing member 6 goes inside into the space 20 to be deformed. At this time, the thin portion A of the second sealing member 8 is deformed, and the flange portion 16 is rotated in such a manner that the flange portion 16 is moved upward. In the case in which a compression force is applied furthermore, as shown in FIG. 4, a contact area of the first sealing member 6 with the matching member 36 is sufficiently ensured, thereby obtaining a reliable sealing force. In particular, a stress concentration occurs to the first swelled portion 32 of the first sealing member 6, thereby imparting sealability.

Moreover, in the state shown in FIG. 4, since the second sealing member 8 is made of a material harder than the first sealing member 6, by locating the second sealing member 8 side onto a chamber side that is a side of severe environments such as a corrosive gas and plasma in a semiconductor manufacturing apparatus such as a dry etching apparatus and a plasma CVD apparatus for instance, the first swelled portion 32 of the first sealing member 6 made of an elastic member can be protected from a corrosive gas and plasma or the like due to a press-fitting caused by the flange portion 14 of the second sealing member 8, thereby preventing the sealability from being deteriorated.

Moreover, in this case, since the second sealing member 8 made of a material harder than the first sealing member 6 is located on the side of severe environments, a resistance against a corrosive gas and plasma or the like is satisfactory, and the entire of the first sealing member 6 made of an elastic member can be protected from a corrosive gas and plasma or the like, thereby preventing the sealability from being deteriorated.

As described above, in the present embodiment, in the case in which the composite sealing material 10 is press-fitted, the crosswise protrusion 12 of the first sealing member 6 falls into the concave space 20, and the second sealing member 8 is deformed by following a deformation of the thin portion A. Moreover, in the case in which a force is released, a restoring force of the crosswise protrusion 12 is applied to the upper flange portion 14 and the lower flange portion 16. Consequently, a stress relaxation hardly occurs to the second sealing member 8.

Consequently, a stable sealability can be maintained even in the case in which the composite sealing material is repeatedly used. Moreover, metal particles can be prevented from being generated since a metal material is not used. Furthermore, since the seal width L1 of the composite sealing material 10 is larger than the groove width L2 of the sealing groove 2 and the width L11 of the lower protrusion 34 is smaller than a width of an upper section, the composite sealing material 10 can be preferably applied to a dovetail groove.

EMBODIMENT

A seal performance and a plasma resistance were evaluated for the following samples.

1. Samples a) Samples in Accordance with the Present Invention

Figure 8A:
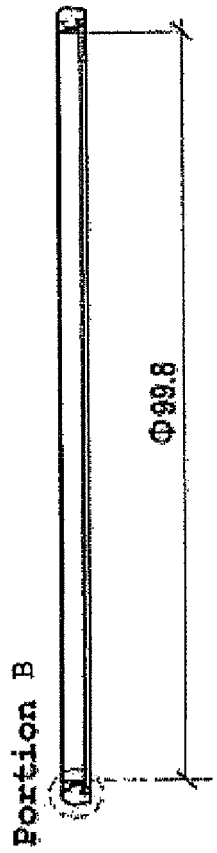
FIGS. 8(A) and 8(B) show a composite sealing material adopted in an evaluation test in accordance with the present invention.
Figure 8B:
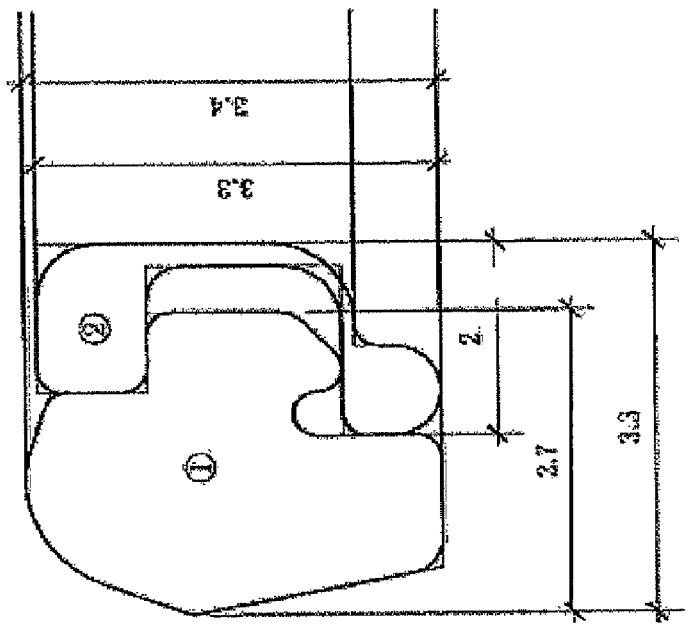
Figure 9:
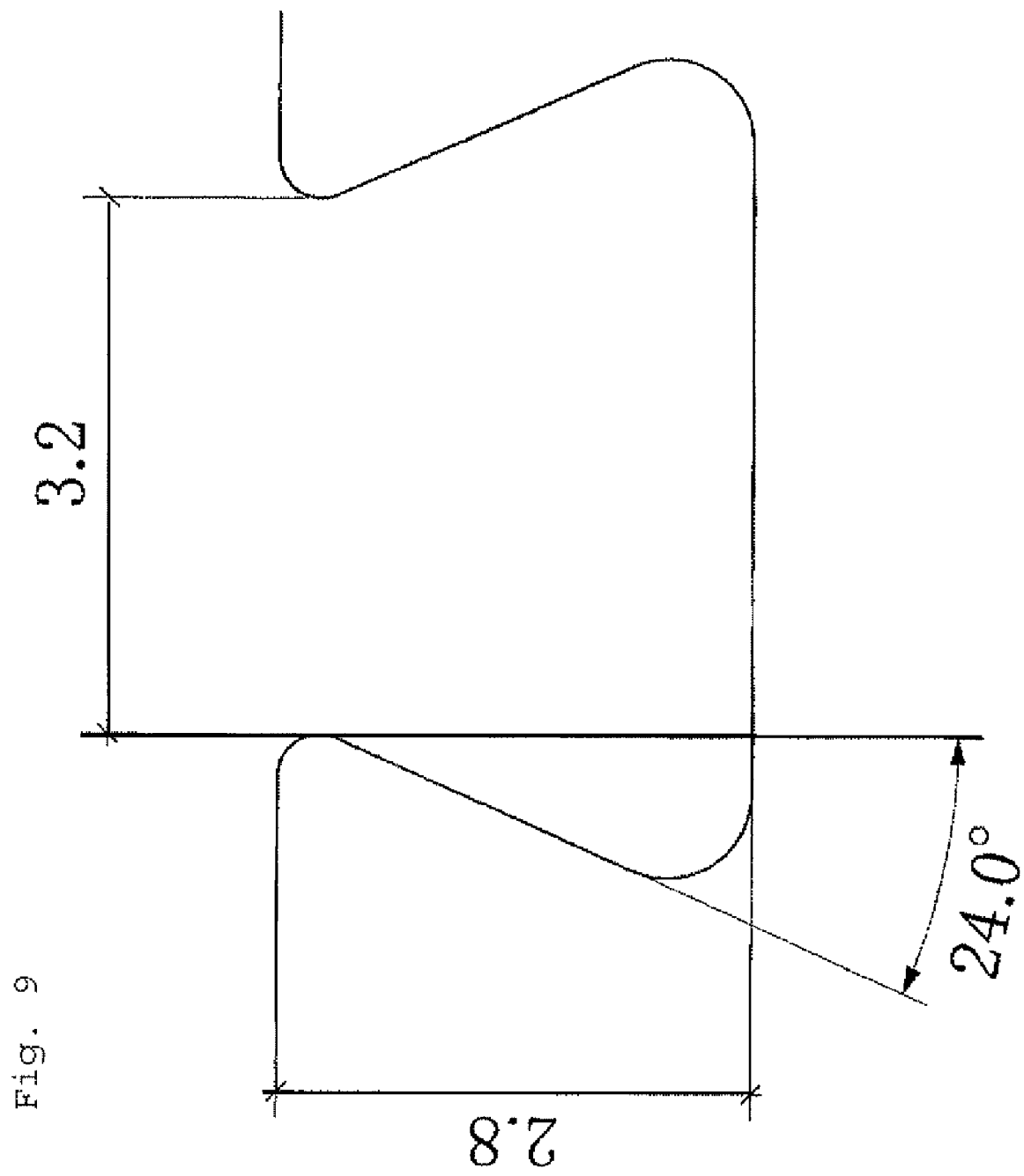
FIG. 9 is a view showing the dimensions of each section of the sealing groove in which the sealing material shown in FIG. 8 is installed.

FIGS. 8(A) and 8(B) show the dimensions and materials. FIG. 9 shows a sealing groove in which the present invention is installed.

b) Conventional Sample 1

A sample similar to one shown in FIG. 9 described in Japanese Patent Application Laid-Open Publication No. 2005-164027.

c) Conventional Sample 2

[NK Ring (product name)] manufactured by NES, Ltd. in the United Kingdom

A sealing material in which a fluorocarbon rubber is completely covered by a jacket made of a fluorocarbon resin.

d) Conventional Sample 3

Fluorocarbon rubber O ring

Dimensions of c) and d): AS568A-241

2. Seal Performance Evaluation Method 2-1) Initial Seal Performance

Figure 5:
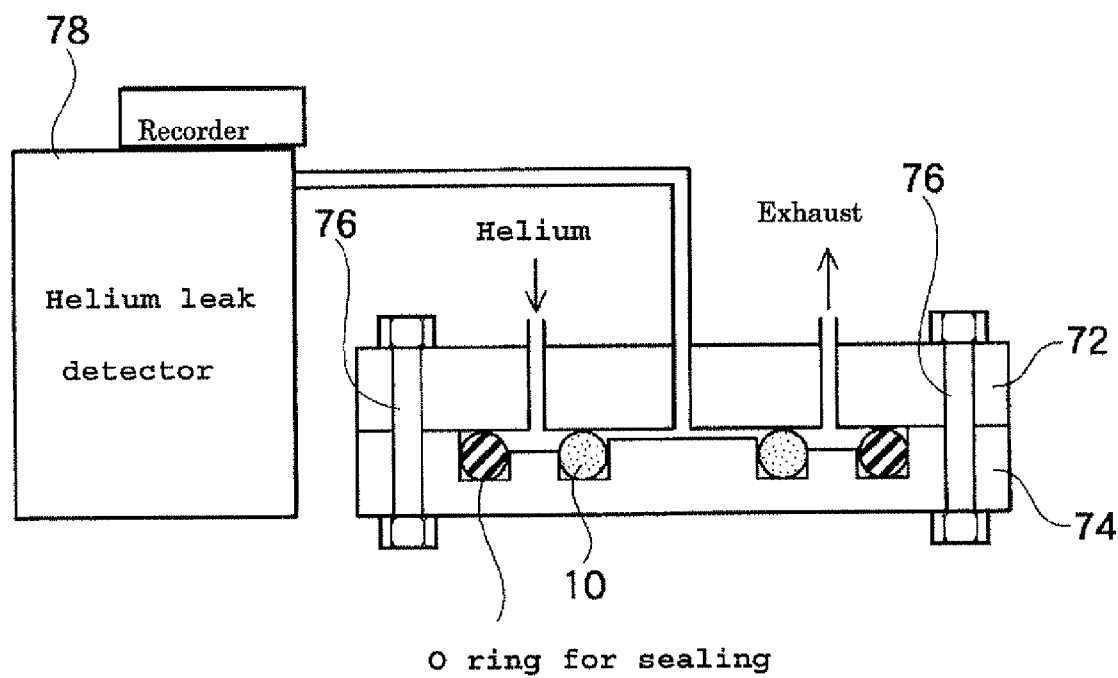
FIG. 5 is a schematic view showing a testing apparatus for researching a sealing performance of a sealing material in accordance with an embodiment of the present invention.

As shown in FIG. 5, a sample 10 was tightened between flanges 72 and 74 at a tightening load of 85 kgf by using bolts 76. An inner diameter side of the sample 10 was then evacuated by a helium leak detector 78, a helium gas was flown (10 ml/min) to the outer diameter side of the sample 10, and a permeation leaking amount of the sample 10 was measured.

2-2) Seal Performance after a Simulated Cycle of Repeated Use

The sample used in the initial seal performance evaluation was also used.

The bolts were detached after the initial seal test, the flanges were fixed to a testing machine (hydraulic turbo strength testing machine manufactured by Shimadzu Corporation), and the cycle of [release→compression up to a predetermined load→release] was repeated ten thousand times.

After the cycle, a leaking amount was measured according to a procedure equivalent to that of 2-1).

3. Plasma Resistance Evaluation Test Method 3-1) Initial Plasma Resistance

Figure 6:
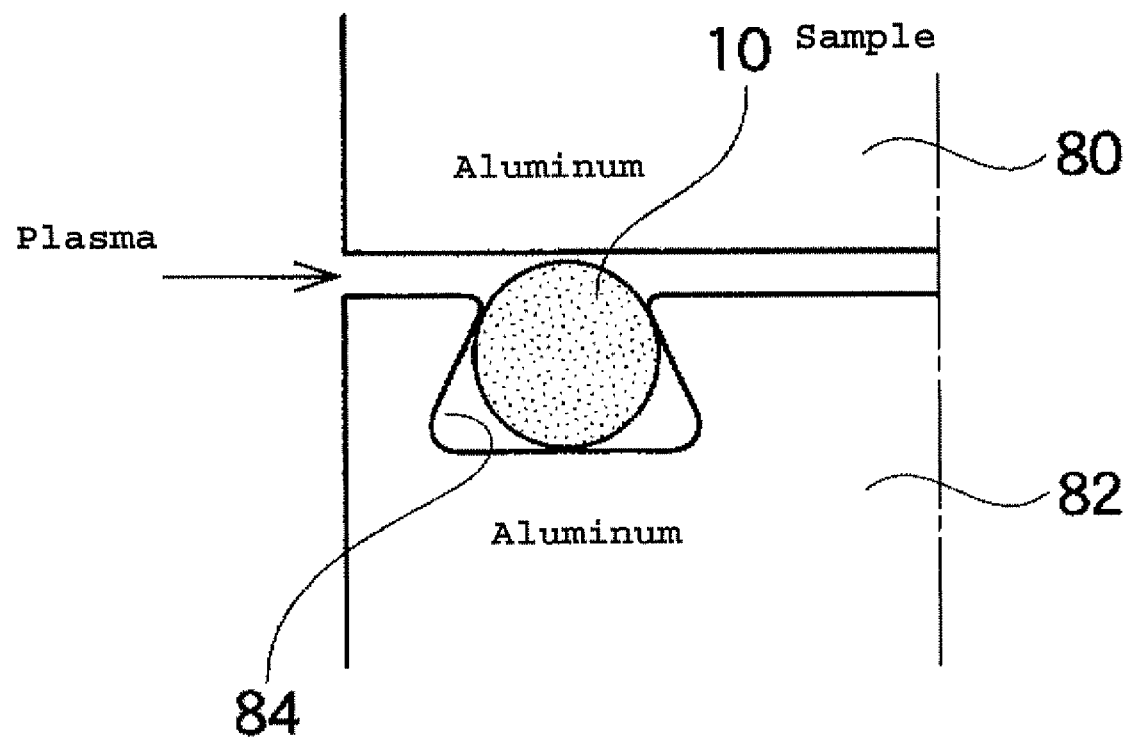
FIG. 6 is a schematic view showing a jig for evaluation that is used in the case in which a sample is disposed on a sealing apparatus.
Figure 7:
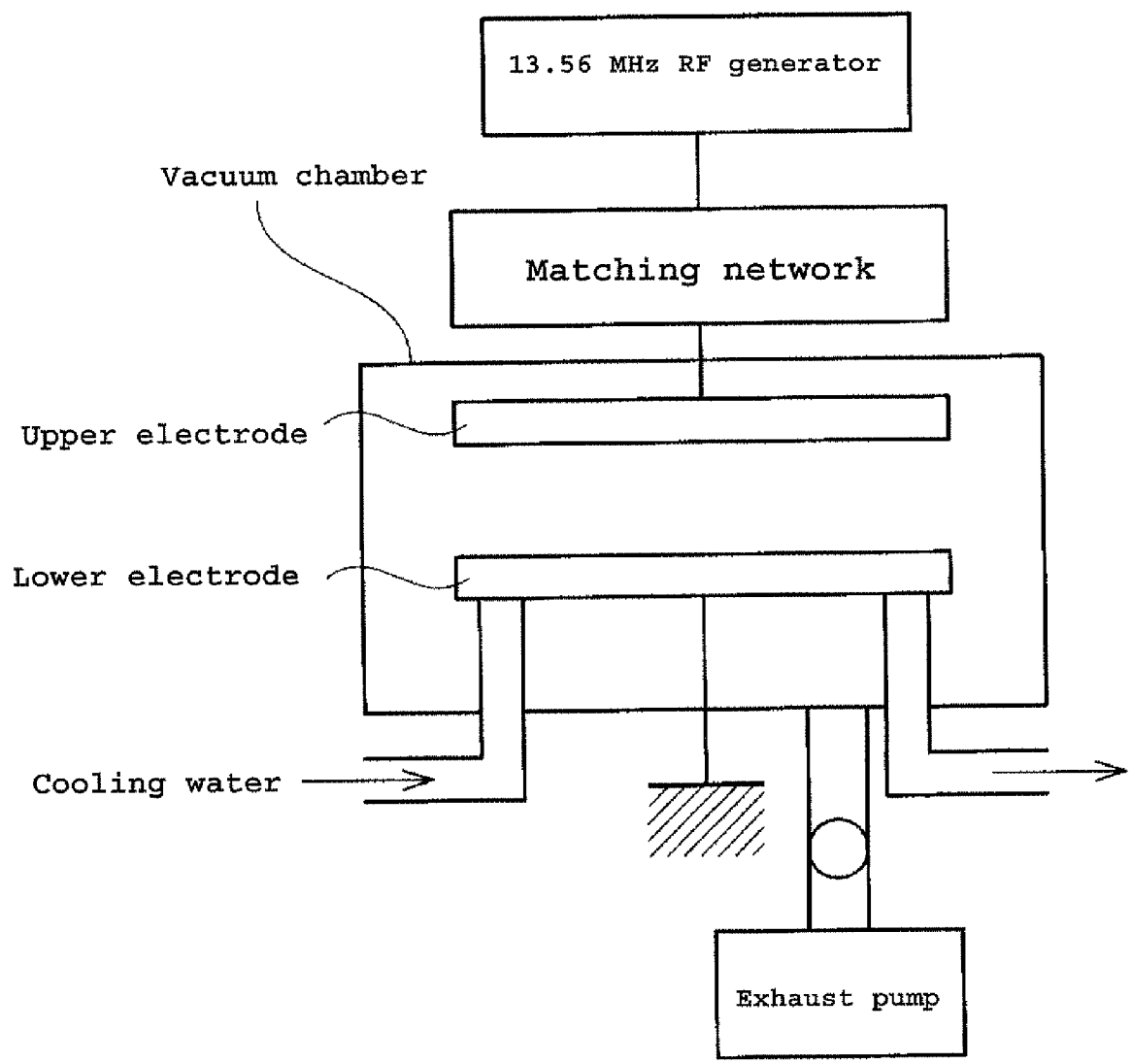
FIG. 7 is a schematic view showing a testing apparatus for researching a plasma resistance.

As shown in FIG. 6, there was prepared a plasma evaluation jig that was made of aluminum and that was composed of an upper material 80 and a lower material 82 both in an almost disc shape in which a dovetail groove 84 for installing a sample was formed in the lower material 82. A sample 10 was then installed in the lower material 82 of the plasma evaluation jig, and the upper material 80 was fixed at a predetermined tightening load (85 kgf) with a bolt. Subsequently, the evaluation jig in which the sample was installed was disposed on a lower electrode of a plasma CVD apparatus as shown in FIG. 7, and plasma was irradiated under the following conditions.

Plasma output power: 500 W

Irradiating time: three hours

Introduction gas: oxygen 180 sccm/$CF_4$ 20 sccm

Degree of vacuum: 0.6 Torr

Jig gap: 0.1 mm to 0.2 mm 3-2) Initial Plasma Resistance after a Simulated Cycle of Repeated Use A sample that is different from that of 3-1) was used for an evaluation.

After the sample was installed in the jig of 3-1), the jig was fixed to a testing machine (hydraulic turbo strength testing machine manufactured by Shimadzu Corporation) similarly to 2-2), and the cycle of [release→compression up to a predetermined load →release] was repeated ten thousand times. After the cycle, plasma was irradiated according to a procedure equivalent to that of 3-1).

4. Test Results

The test results are shown in the table. A performance of each sample was evaluated by two marks of ○ and x.

TABLE 1

| 4-1) Seal performance | | |
|---|---|---|
| | Initial stage | After repetition |
| Embodiment | ○ | ○ |
| Conventional sample 1 | ○ | ○ |
| Conventional sample 2 | X | Not executed (note 1) |
| Conventional sample 3 | ○ | ○ |

(note 1)
since a sufficient performance was not displayed at the initial stage, a performance after the repeated cycle was not evaluated.

The criteria of the seal performance is ○ in the case in which a leaking amount is less than $1.0 \times 10^{-5}$ and X in the case in which a leaking amount is $1.0 \times 10^{-5}$ or larger.

TABLE 2

| 4-2) Plasma resistance | | |
|---|---|---|
| | Initial stage | After repetition |
| Embodiment | ○ | ○ |
| Conventional sample 1 | ○ | X |
| Conventional sample 2 (NK Ring) | ○ | ○ |
| Conventional sample 3 (rubber O ring) | X | Not executed (note 2) |

(note 2)
since a sufficient performance was not displayed at the initial stage, a performance after the repeated cycle was not evaluated.

The criteria of the plasma resistance is ○ in the case in which a surface was not etched when the surface was observed with a microscope of 1000 times power and X in the case in which a surface was etched.

For the embodiment, the seal performance and the plasma resistance were both satisfactory after the cycle.

For the conventional sample 1, the plasma resistance after the repeated cycle was not sufficient. The cause is thought that a relaxation progressed with a repeated compression for a resin portion and a force of repulsion for a sufficient contact with a matching face was lost.

While the preferred embodiments of the present invention have been described above, the present invention is not restricted to the embodiments, and various changes and modifications can be thus made without departing from the scope of the present invention. For instance, while the above embodiment describes the case in which the present invention is applied to a semiconductor manufacturing apparatus such as a dry etching apparatus and a plasma CVD apparatus, the composite sealing material in accordance with the present invention can also be used for sealing sections of other apparatuses used under the severe conditions of other environments and can also be applied to a sealing groove other than the dovetail groove.

The invention claimed is:

1. A seal assembly having a composite sealing material in a sealing groove of a first member, the composite sealing material comprising:

a first sealing member that is located on the outer peripheral side of the sealing groove and that is made of an elastic member; and a second sealing member that is located on the inner peripheral side of the sealing groove and that is made of a material harder than the first sealing member, wherein the first sealing member is provided with a crosswise protrusion formed projecting in a radial inner direction from a radial inner side of the almost central section of the thickness direction;

the second sealing member is formed in an almost cross sectional C shape by flange portions and formed at the both ends and an inner wall portion in an almost linear shape for connecting the flange portions; and a space is ensured between the crosswise protrusion and the inner wall portion in an almost linear shape of the second sealing member in a state that the first sealing member and the second sealing member are assembled in an integrated manner in the sealing groove; and when a second member contacts the composite sealing member and compresses the composite sealing member the space is ensured.

2. The composite sealing material as defined in claim 1, wherein one side end face of the crosswise protrusion of the first sealing member is formed almost flatly.

3. The composite sealing material as defined in claim 1 or 2, wherein the other side end face of the crosswise protrusion of the first sealing member is formed projecting to the bottom face side of the sealing groove.

4. The composite sealing material as defined in any one of claims 1 to 2, wherein a convex is formed on one of the contact faces of the first sealing member and the second sealing member, a concave is formed on the other contact face, and the convex and concave are assembled while being fitted into each other.

5. The composite sealing material as defined in any one of claims 1 to 2, wherein an adhesive is disposed between the contact faces of the first sealing member and the second sealing member.

6. The composite sealing material as defined in any one of claims 1 to 2, wherein the first sealing member is made of a rubber.

7. The composite sealing material as defined in claim 6, wherein the rubber forming the first sealing member is a fluorocarbon rubber.

8. The composite sealing material as defined in claim 1, wherein the second sealing member is made of a synthetic resin.

9. The composite sealing material as defined in claim 8, wherein a synthetic resin forming the second sealing member is made of at least one kind of a synthetic resin selected from a fluorocarbon resin, a polyimide resin, a polyamideimide resin, a polyetherimide resin, a polyamideimide resin, a polyphenylene sulfide resin, a polybenzimidazole resin, and a polyether ketone resin.

* * * * *